United States Patent
Burdine et al.

(10) Patent No.: US 7,340,496 B2
(45) Date of Patent: Mar. 4, 2008

(54) SYSTEM AND METHOD FOR DETERMINING THE NTH STATE OF LINEAR FEEDBACK SHIFT REGISTERS

(75) Inventors: Todd M. Burdine, Wappingers Falls, NY (US); Edward E. Kelley, Wappingers Falls, NY (US); Franco Motika, Hopewell Junction, NY (US)

(73) Assignee: International Business Machines Corporation, Armnok, NY (US)

( * ) Notice: Subject to any disclaimer, the term of this patent is extended or adjusted under 35 U.S.C. 154(b) by 795 days.

(21) Appl. No.: 10/707,481

(22) Filed: Dec. 17, 2003

(65) Prior Publication Data

US 2005/0135621 A1    Jun. 23, 2005

(51) Int. Cl.
G06F 1/02 (2006.01)
(52) U.S. Cl. ..................................... 708/252
(58) Field of Classification Search ......... 708/250–256
See application file for complete search history.

(56) References Cited

U.S. PATENT DOCUMENTS

| | | | |
|---|---|---|---|
| 4,142,240 A * | 2/1979 | Ward et al. ................. | 708/250 |
| 5,191,610 A | 3/1993 | Hill et al. | |
| 5,235,423 A | 8/1993 | Dunbar et al. | |
| 5,383,143 A | 1/1995 | Crouch et al. | |
| 5,566,099 A * | 10/1996 | Shimada ..................... | 708/250 |
| 5,619,512 A | 4/1997 | Kawashima et al. | |
| 5,703,952 A | 12/1997 | Taylor | |
| 5,757,923 A * | 5/1998 | Koopman, Jr. .............. | 708/250 |
| 6,014,446 A | 1/2000 | Finkelstein | |
| 6,069,954 A | 5/2000 | Moreau | |
| 6,263,082 B1 | 7/2001 | Ishimoto et al. | |
| 6,374,354 B1 | 4/2002 | Walmsley et al. | |
| 6,408,317 B1 | 6/2002 | Djakovic | |
| 6,480,101 B1 | 11/2002 | Kelly et al. | |
| 6,934,730 B2 * | 8/2005 | Direen et al. ............... | 708/250 |
| 2005/0044119 A1 * | 2/2005 | Langin-Hooper et al. ... | 708/250 |

* cited by examiner

*Primary Examiner*—Chat C. Do
(74) *Attorney, Agent, or Firm*—Kerry B. Goodwin; Shelley M. Beckstrand

(57) ABSTRACT

The Nth state of an n-stage linear feedback shift register (LFSR) used to generate pseudo random binary sequences or patterns, and which may be configured as a multiple input signature register (MISR) or single input signature register (SISR) to compress data and generate signatures, is determined by building a look-up table of n-bit states for latch positions of the linear feedback shift register; obtaining the modulo remainder of the Nth state; and generating the Nth state directly from the modulo remainder and n-bit states.

9 Claims, 11 Drawing Sheets

LFSR STANDARD CONFIGURATION

LFSR MODULAR CONFIGURATION

STATE DIAGRAM

SINGLE INPUT SIGNATURE REGISTER (SISR)

MULTIPLE INPUT SIGNATURE REGISTER (MISR)

MAXIMAL LENGTH LFSR MULTIPLE INPUT SIGNATURE REGISTER (MISR)

| | L5 | L4 | L3 | L2 | L1 |
|---|---|---|---|---|---|
| 0 | 1 | 1 | 1 | 1 | 1 |
| 1 | 1 | 1 | 1 | 0 | 1 |
| 2 | 1 | 1 | 1 | 0 | 0 |
| 3 | 0 | 1 | 1 | 1 | 0 |
| 4 | 0 | 0 | 1 | 1 | 1 |
| 5 | 1 | 0 | 0 | 0 | 1 |
| 6 | 1 | 1 | 0 | 1 | 0 |
| 7 | 0 | 1 | 1 | 0 | 1 |
| 8 | 1 | 0 | 1 | 0 | 0 |
| 9 | 0 | 1 | 0 | 1 | 0 |
| 10 | 0 | 0 | 1 | 0 | 1 |
| 11 | 1 | 0 | 0 | 0 | 0 |
| 12 | 0 | 1 | 0 | 0 | 0 |
| 13 | 0 | 0 | 1 | 0 | 0 |
| 14 | 0 | 0 | 0 | 1 | 0 |
| 15 | 0 | 0 | 0 | 0 | 1 |
| 16 | 1 | 0 | 0 | 1 | 0 |
| 17 | 0 | 1 | 0 | 0 | 1 |
| 18 | 1 | 0 | 1 | 1 | 0 |
| 19 | 0 | 1 | 0 | 1 | 1 |
| 20 | 1 | 0 | 1 | 1 | 1 |
| 21 | 1 | 1 | 0 | 0 | 1 |
| 22 | 1 | 1 | 1 | 1 | 0 |
| 23 | 0 | 1 | 1 | 1 | 1 |
| 24 | 1 | 0 | 1 | 0 | 1 |
| 25 | 1 | 1 | 0 | 0 | 0 |
| 26 | 0 | 1 | 1 | 0 | 0 |
| 27 | 0 | 0 | 1 | 1 | 0 |
| 28 | 0 | 0 | 0 | 1 | 1 |
| 29 | 1 | 0 | 0 | 1 | 1 |
| 30 | 1 | 1 | 0 | 1 | 1 |
| | 1 | 1 | 1 | 1 | 1 |

| | IN1 | IN2 | L5 | L4 | L3 | L2 | L1 |
|---|---|---|---|---|---|---|---|
| 0 | 0 | 1 | 1 | 1 | 1 | 1 | 1 |
| 1 | 1 | 1 | 1 | 1 | 1 | 0 | 1 |
| 2 | 0 | 1 | 1 | 0 | 0 | 0 | 1 |
| 3 | 1 | 1 | 0 | 0 | 1 | 0 | 1 |
| 4 | 0 | 0 | 1 | 0 | 0 | 1 | 1 |
| 5 | 0 | 0 | 1 | 1 | 0 | 0 | 0 |
| 6 | 1 | 1 | 1 | 1 | 0 | 0 | 0 |
| 7 | 1 | 1 | 1 | 1 | 0 | 0 | 0 |
| 8 | 0 | 0 | 0 | 1 | 1 | 0 | 0 |
| 9 | 0 | 1 | 0 | 0 | 0 | 1 | 0 |
| 10 | 1 | 0 | 1 | 0 | 0 | 0 | 1 |
| 11 | 1 | 0 | 0 | 1 | 0 | 0 | 1 |
| 12 | 0 | 0 | 1 | 0 | 1 | 0 | 1 |
| 13 | 0 | 0 | 1 | 1 | 0 | 1 | 1 |
| 14 | 0 | 0 | 1 | 1 | 1 | 0 | 0 |
| 15 | 1 | 0 | 1 | 1 | 1 | 1 | 0 |
| 16 | 1 | 0 | 1 | 1 | 1 | 1 | 1 |
| 17 | 1 | 1 | 0 | 1 | 0 | 1 | 0 |
| 18 | 0 | 1 | 0 | 0 | 0 | 0 | 1 |
| 19 | 0 | 1 | 1 | 0 | 1 | 0 | 1 |
| 20 | 0 | 1 | 1 | 1 | 1 | 1 | 1 |
| 21 | 0 | 1 | 1 | 1 | 0 | 1 | 0 |
| 22 | 1 | 1 | 1 | 1 | 1 | 0 | 1 |
| 23 | 1 | 1 | 0 | 1 | 0 | 1 | 1 |
| 24 | 1 | 0 | 0 | 0 | 0 | 0 | 0 |
| 25 | 1 | 1 | 1 | 0 | 1 | 0 | 0 |
| 26 | 0 | 1 | 0 | 1 | 0 | 1 | 0 |
| 27 | 0 | 0 | 0 | 0 | 0 | 0 | 1 |
| 28 | 0 | 1 | 1 | 0 | 1 | 0 | 1 |
| 29 | 0 | 0 | 1 | 1 | 1 | 1 | 1 |
| 30 | 0 | 1 | 1 | 1 | 0 | 1 | 0 |

PRIOR ART   FIG. 10

CYCLE N = 10 = 2 + 8        FIG. 13

128 – BIT LFSR HARDWARE EXAMPLE

SYSTEM AND METHOD FOR DETERMINING THE NTH STATE OF LINEAR FEEDBACK SHIFT REGISTERS

BACKGROUND OF INVENTION

This invention relates to simulation of linear feedback shift registers (LFSR). More particularly, it relates to the use of linear superposition properties and state skipping to determine the Nth state of the LFSR.

Several applications require the simulation of large LFSRs to determine the state of the machine. Examples of such applications include password generation, BIST convergent signature analysis, secure credit card, integrated system security, and diverse encryption encoding and decoding systems.

A linear feedback shift register has may uses in testing, communication, and encryption application. In the present invention, it is used to generate pseudo random binary sequences or patterns, and may be configured as a multiple input signature register (MISR) or single input signature register (SISR) to compress data and generate signatures.

Referring to FIGS. 1 and 2, an LFSR is a special configuration of a linear circuit into a special form of shift register or counter. These circuits require only a clock input 90, making them autonomous, and include three basic logic components:

1. Latch or D-type flip-flop or a unit delay 96, 98.
2. Exclusive-OR (XOR) or modulo-2 adder 92, 94.
3. Modulo-2 scalar multiplier 84, 86.

An LFSR circuit 80, 82 can take either of two equivalent or dual forms: the standard generic LFSR 80 of FIG. 1 or the modular generic LFSR 82 of FIG. 2. Each cell 96 (L1, L2, L3, ..., Ln-1, Ln) and 98 (L1, ..., Ln-3, Ln-2, Ln-1, Ln) in each type has the same structure and is replicated for the desired length n of the LSFR 80, 82. Modulo-2 scalar multiplier C1 to Cn-1 84, 94 is either 0 or 1, which results in a connection or no-connection for the feedback signal 88, 90, respectively.

Some of the characteristics of an LFSR are its length or number of cells (n), the feedback configuration or values of each Ci, and the initial state of the circuit. A maximal length LFSR is a circuit that cycles through $2^n-1$ unique states when initialized with a non-zero value. The maximum number of unique states of an n length shift register is $2^n$, so a maximal length LFSR cycles through all the possible states except when initialized to zero. A non-maximal length LFSR also cycles through a sub-set of $2^n$ states depending on the initial seed or initial value.

FIG. 3 illustrates the truth table for a modulo-2 adder, and a simple example of an LFSR 74 is shown in FIG. 4. The LFSR of FIG. 4 is a simple three stage (n=3) maximal length configured LFSR. In this case the outputs from latches L2 and L3 are XORed and fed back to L1. The state table 78 of FIG. 4 and state diagram 76 of FIG. 5 illustrate the sequence of states that LFSR 74 cycles through after being initialized to all "1"s at state $S_0$. The binary output sequence 1110010 is seven bits before it starts repeating.

The length of the simple circuit of FIG. 4 can be extended to provide long sequences of binary pseudo random numbers. For example, a 32-bit maximal length LFSR can cycle for over four billion states before repeating. Furthermore, by selecting the appropriate feedback parameters for the LFSR, one can generate unique sequences for each configuration.

Referring to FIGS. 6 and 7, the general theory of operation and characteristics of the LFSR when used for data compression as a signature generation register will be described. There are many data compression algorithms and hardware implementations that can be used to generate signatures, but the use of an LFSR as a single input signature register (SISR) or multiple input signature register (MISR) has the advantage that it can be easily implemented in both hardware and software with low aliasing probability and a high degree of customization flexibility.

In a signature register, one or more bits of input data are XORed on every Nth shift cycle of the LFSR. Typically, data is clocked into the LFSR on every shift cycle. The LFSR can be configured as an SISR or MISR. The single input configuration is usually used to serially compress long data bit strings, while the multiple input configuration can be used for simultaneous parallel compression of multiple bit groups such as a byte or word of input data as shown in FIGS. 6 and 7, respectively.

The data input(s) to the LFSR can be XORed at any point in to the circulating shift register. The maximum number of possible single inputs for an N-length LFSR is N. If the number of inputs is greater than N, the length of the LFSR may be increased, or subsets of inputs XORed for each MISR input. The output or signature of the SISR or MISR is usually the final state of the LFSR after all the data has been compressed or shifted into the LFSR. The length of the output signature can be the whole length of the LFSR or a truncated portion of N.

The MISR or SISR can be further customized by selecting the initial seed or state prior to data compression, selecting the feedback configuration, input structure, number of shift cycles per data bit(s), and lengths of the LFSR. The length of the LFSR can be optimized for a particular system platform (i.e. 32-bits, 64-bits, 128-bits, 256-bits, or any bit length) or tailored for security robustness.

FIG. 8 illustrates an example of a 2-input 5-stage MISR with the associated state table of FIGS. 9 and 10 for two input data sequences, FIG. 9 for the case where input 1 and input 2 are both 0, and FIG. 10 for the case where input values in1 and in2 may take on various sequences of 0 and 1 for each of the 31 states.

As a computer's ability to resolve encrypted data improves, the need to run LSFRs with a large number of cycles increases. The problem, then, with a typical LSFR, is that if a large number of cycles are to be run, it will take a considerable length of time.

SUMMARY OF INVENTION

In accordance with an aspect of the invention, there is provided a system, method, or computer program product configured determining the Nth state of an n-stage linear feedback shift register (LFSR) by building a look-up table of n-bit states for latch positions of the linear feedback shift register; obtaining the modulo remainder of the Nth state; and generating the Nth state directly from the modulo remainder and n-bit states.

Other features and advantages of this invention will become apparent from the following detailed description of the presently preferred embodiment of the invention, taken in conjunction with the accompanying drawings.

BRIEF DESCRIPTION OF DRAWINGS

FIG. 10 illustrates an example input data sequence for the MISR of FIG. 8 for the case where input values in1 and in2 may take on various sequences of 0 and 1 for each of 31 states.

DETAILED DESCRIPTION

In accordance with the invention, a state skipping method using linear superposition properties is provided for determining the Nth state of a linear feedback shift register (LFSR). Thus, rather than executing an LSFR N number of cycles to produce a random number, the present invention allows an almost immediate generation of the Nth cycle of the LSFR.

Figure 11:
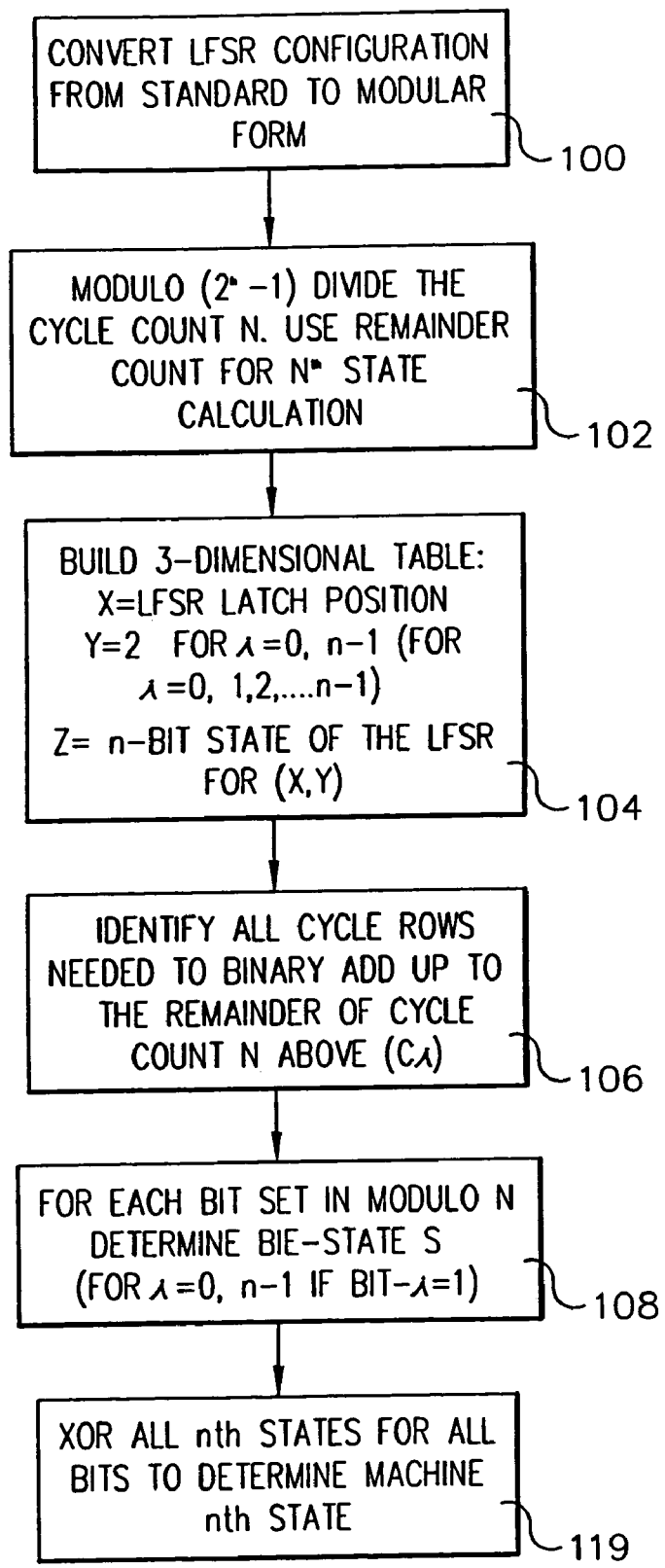
FIGS. 11 and 12 are flow chart representations of the state skipping method of the invention using linear super-position properties for determining the Nth state of a linear feedback shift register (LFSR).
Figure 12:
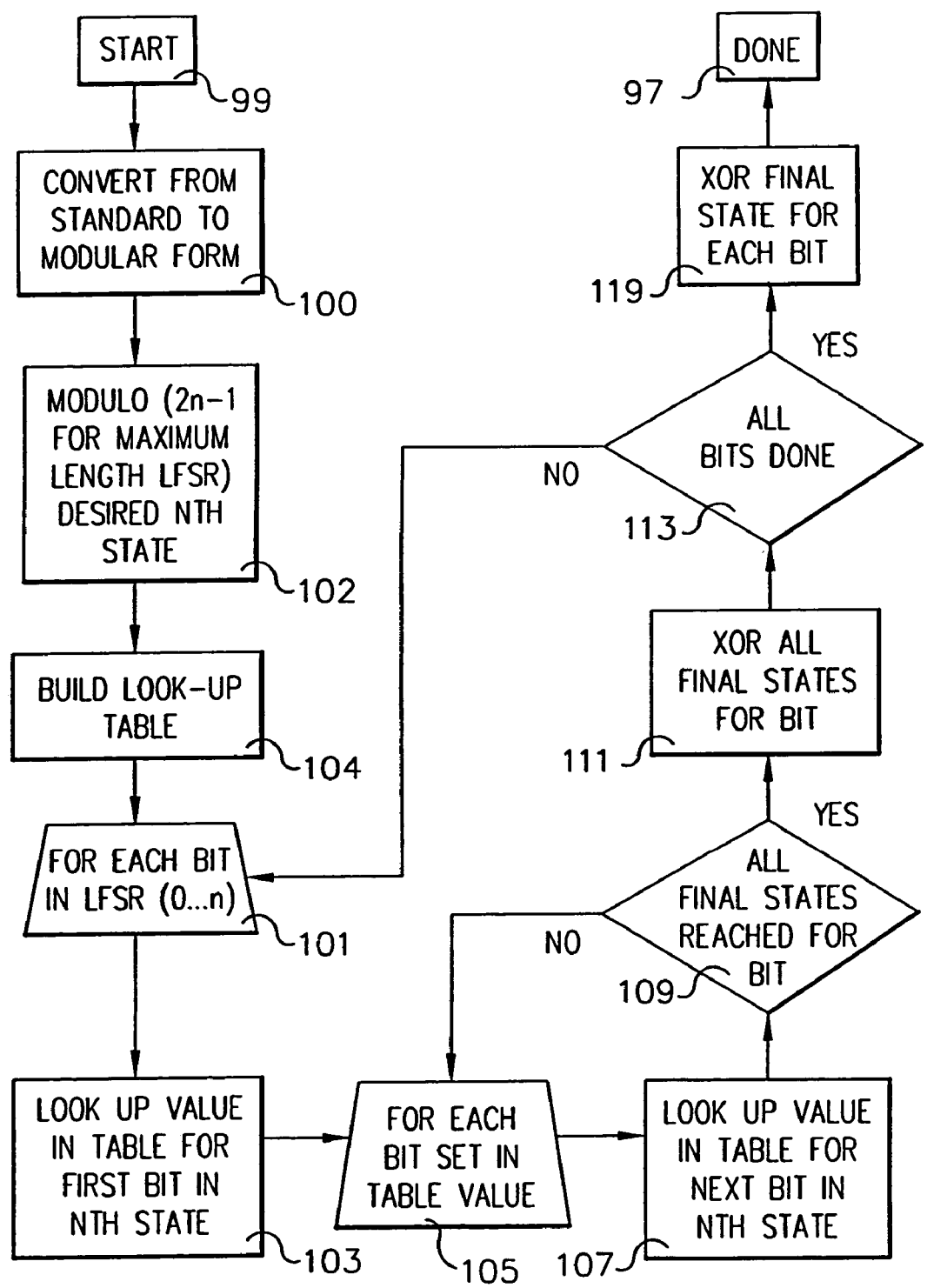

Referring to FIGS. 11 and 12, this algorithm includes the following steps.

In step 100, the LFSR configuration is converted from standard to modular form (or the other way, depending on the algorithm implementation). In this specific embodiment, the algorithm is described for the modular form. The standard form is the mathematical equivalent.

To convert from the modular form of LFSR configuration to its dual standard form, the direction of all data flow between latches is reversed, all XORs between latches are removed and all feedbacks into the first latch are XORd. (This results in different state sequences and yields a different lookup table 112.)

In step 102, the cycle count N is modulo ($2^n-1$ for maximum length LFSR) divided. The remainder cycle count is used for the Nth state calculation.

In step 104, a 3-dimensional table is built via simulation or bootstrapping, with
 x=LFSR latch position (e.g. 0, 1, . . . , n−1);
 y=$2^i$ for i=0, n−1 (for i=0, 1, 2, 3, . . . , n−1), giving values (0, 1, 2, 4, 8, . . . , $2^{n-1}$);
 z=n-bit state of the LFSR machine for (x, y).

Figure 13:
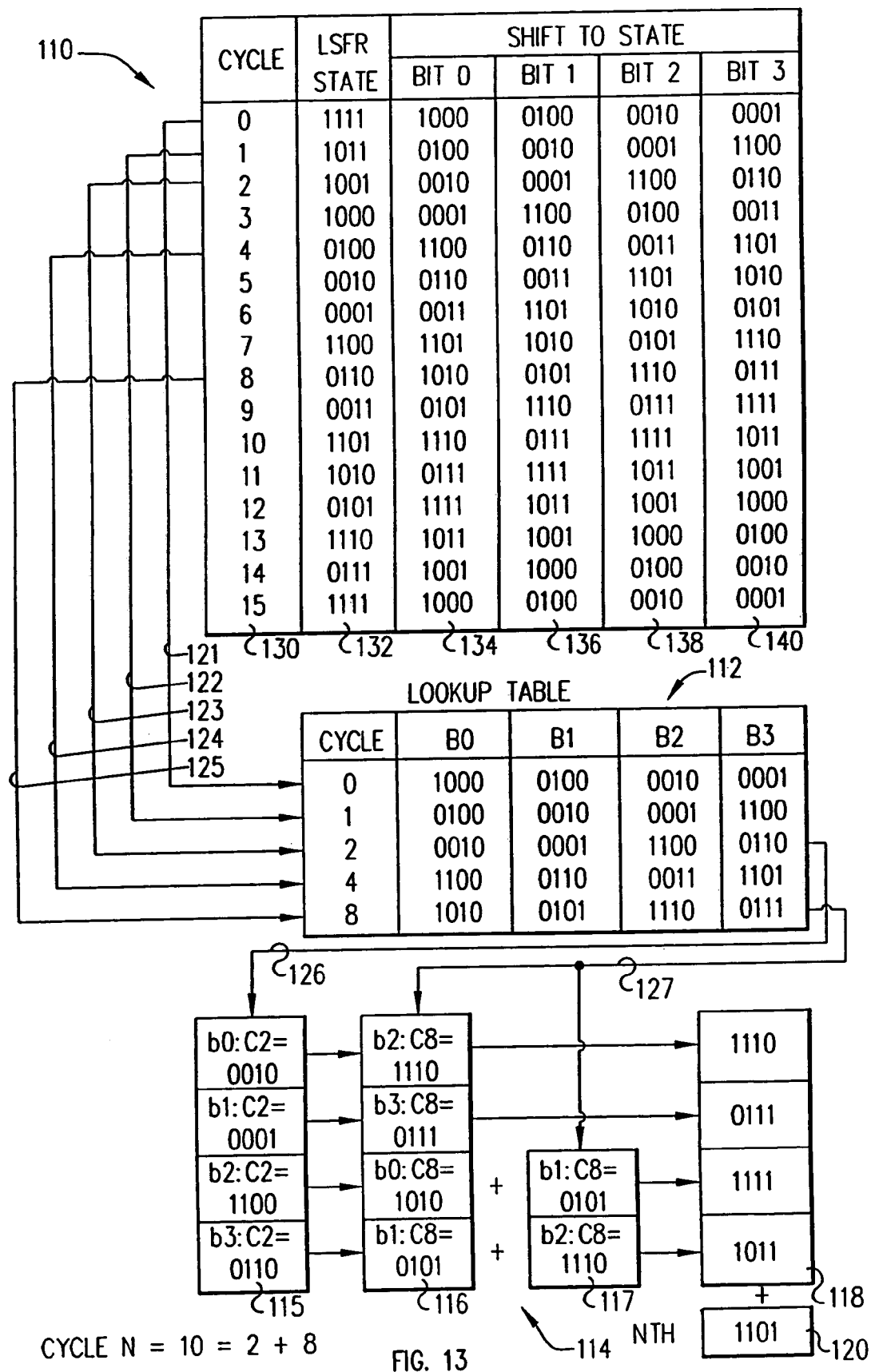
FIG. 13 is first schematic and tabular representation of an example execution of the algorithm of the invention.

In the bootstrapping technique for building this table, the next ($2^{i+1}$) entry for each specific bit is obtained by using the Nth state algorithm calculation of step 102. This can be done by taking all the previous $2^i$ entries and calculating the ($2^{i+1}$−1)th state and then simulating the LFSR for one cycle to the ($2^{i+1}$)th state. In the example of FIG. 13, Table 112, the x values represent the bit positions B0, B1, B2, B3; the y values represent the cycle count 0, 1, 2, 4, 8; and the z values represent the shift-to states 1000, 01000, . . . , 1110, 0111.

In step 106, all cycle rows needed to binary add up to the remainder N" of cycle count N above ($C_i$) are identified. In the example of FIG. 13, for N"=hex 10, cycle rows 2 and 8 are selected from Table 112, with cycle row 2 from Table 112 used to generate object 115 and cycle 8 from Table 112 used to generate objects 116 and 117.

In step 108, for each bit set in N", the remainder cycle count of N, the bit-state $S_i$ (for i=0, n−1 if bit-i=1) is determined. This is done as follows. In step 101, each bit set in N" is identified. For each identified bit in N", in step 103 the state $S_{first\ cycle\ row}$ for each single bit set in $S_i$ is determined by using the table in step 104. In steps 105, 107, 109 for each bit set in state $S_{first\ cycle\ row}$ state $S_{next\ cycle\ row}$ is determined. In step 111, all $S_{final\ cycle\ row}$ states are XORed to determine the nth state for bit N". In step 199, when step 113 determines that all bits are done, all nth states for all bits are XORed to determine machine nth state. In step 97, processing is complete and the result available for use.

Figure 14:
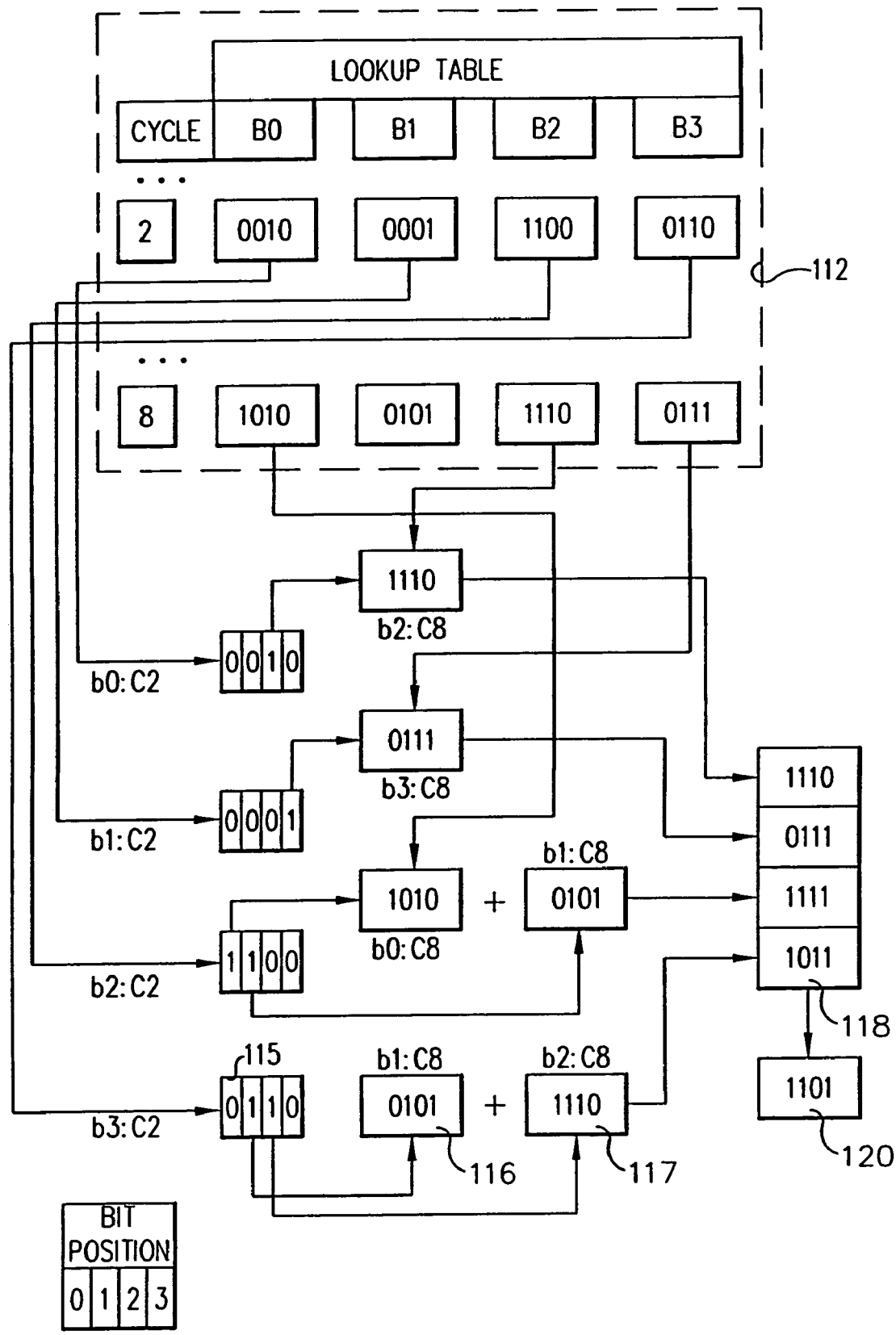
FIG. 14 is second schematic and tabular representation of an example execution of the algorithm of the invention.

Referring to FIGS. 13 and 14, an example execution of the algorithm of the invention is set forth for the following:
 LFSR Length=4 latches (0-3)
 LFSR Configuration=Feedback from latch 3→latch 0 and 1
 Initial state="1111"
 N=10
 Nth state=result to be determined by this algorithm Table 110 illustrates for the above LFSR configuration for each of 16 cycles 0-15 the LFSR machine state 132 and corresponding shift to states 132-140 for each bit 0-3 of the LSFR state 132. This table 110 does not represent the present invention, but is used to illustrate that by use of lookup table 112 and calculations 114, the same result 120 is obtained. That is, in the example of FIGS. 13 and 14, result 120 for the Nth cycle=1101, which is the same as LSFR state 132 for the 10th cycle 130.

Result 120 is generated by brute force or by executing the algorithm of FIG. 11.

The brute force method selects for, say, the nth cycle 130 of 10, the corresponding entry in LSFR state column 132, which is equal to 1101.

Referring to FIG. 13 in connection with FIGS. 11 and 12, the algorithm method for determining result 120 includes in step 104 building lookup table 112, as is illustrated by lines 121-125, which populate table 112 for powers of 2 entries at cycles 130 of 0, 1, 2, and 8, respectively. Then, in steps 101, 103, 105, 107, 109, 111, 113 the value of each bit is determined and in step 119 XORed to get the Nth state 120 result of 1101.

To determine the result for cycle N=10, in step 102 N is reduced to powers of two values 2 and 8.

Shift to states 115 B0-B3 for cycle 2 are, for bit 0=0010, for bit 1=0001, for bit 2=1100, and for bit 3=0110. Shift to states 116 and 117 for cycle 8 are, for bit b2=1110, for bit b3=0111, for bit b0=1010, for bit b1=0101.

In step 111, results 118 are obtained by XOR of values 116 and 117, which are obtained as is represented by line 127 from table 112, the final cycle row states (in this example, cycle 8) for each bit set in cycle 2 115, as is represented by line 126. In step 119, the LSFR state at cycle 10 result 120=1101 is obtained by XORing the result values 118 of 1110, 0111, 1111, and 1011.

Thus, for cycle 2, bit 0 shift to state is 0010. In this value 0010, bit 2 is set to one, and bits 0, 1, and 3 are set to zero. Thus, the next cycle for bit 2 must be determined, and that is 1110. As only one bit (bit 2) is set in the shift to state 0010 for bit 0 in cycle 2, the value 0010 is fed to intermediate result 118.

Again, for cycle 2 (that is c2), bit 3 (that is, b3) is b3:c2=0110, designated by the reference number 115, from table 112, row 2. Two bits (bits 1 and 2) are set in the value 0110, and values 116 and 117, b1:c8=0101 and b2:c8=1110, respectively, are obtained from look-up table 112, as is represented by line 127. The values 116, 117 (0101 and 1110, respectively) are XORed and loaded to intermediate result 118 as value 1011.

If three bits were set, for this example, in a cycle 2 result 115, then three values 116, 117, and one other, would be obtained from look-up table 112, and so forth.

In the event that the desired machine state N resolves to three, for example, binary values (say N=11, or "x"0111) in which case binary values 1, 2 and 8 result), then a similar process 114 requires three iterations, including first determining for cycle 1 each bit b0:c1, b1:c1, b2:c1, and b3:c1 which shift to state bits are set. Then for each shift to state bit set for cycle c1, a process similar to that discussed for elements 116 and 117 is executed to determine which state bits are set in c2, and the process repeated to determine for each state bit set in c2 the shift to values from table 112 for cycle 8.

Result 120 is available for use in several applications, including password generation, BIST convergent signature analysis, secure credit card, integrated system security, and diverse encryption encoding and decoding systems, herein referred to generically as N-state applications. For example, the method of the invention may be used in the LSFR used to calculate a given number of cycles to arrive at a specific number in the secure credit card application described in co-pending U.S. Pat. No. 6,641,050, issued Nov. 4, 2003, the teachings of which are incorporated herein.

Figures 8, 9:
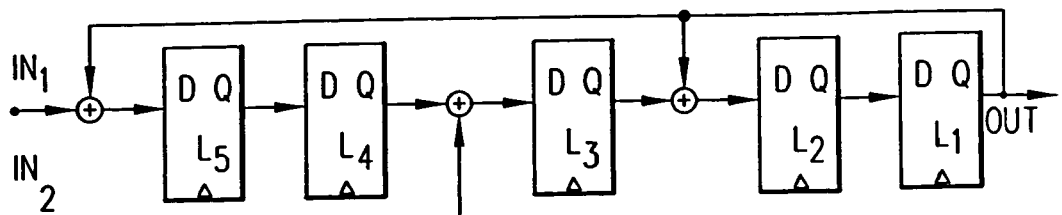
FIG. 8 is a schematic representation of an example of a 2-input 5-stage MISR.
FIG. 9 illustrates an example input data sequence for the MISR of FIG. 8 for the case where input 1 and input 2 are both 0.
Figure 15:
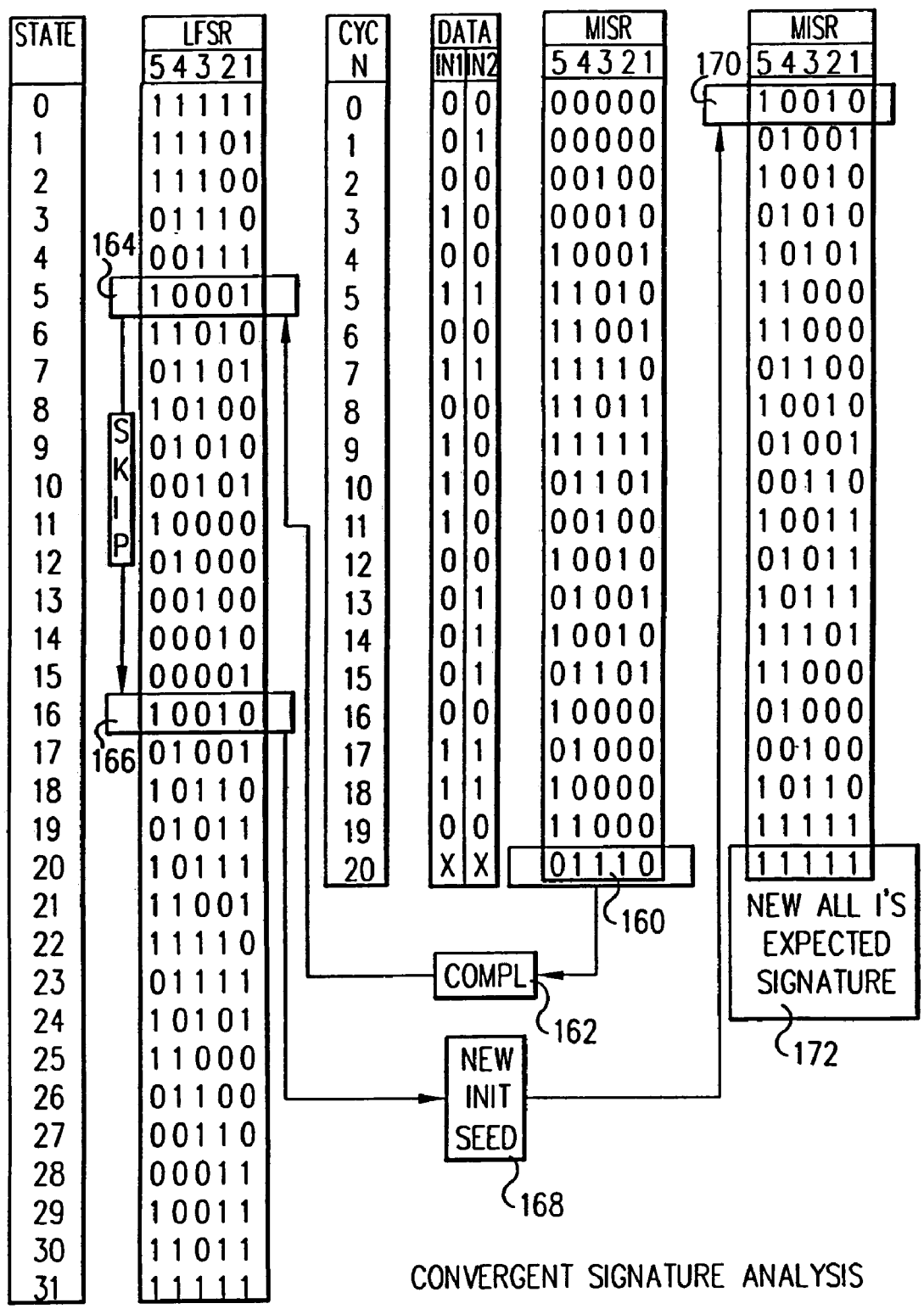
FIG. 15 is a tabular illustration of convergent signature analysis.

FIG. 15 illustrates a convergent signature analysis example for an all "1" example of FIG. 8 for n=5, $2^n-1=31$ states, at the 20th cycles (for this example). In this example, the original expected signature 160, value 01110 at cycle N=20 is complemented 162 and the complemented value 164, value 10001, found at state 5 of the LFSR. $2^n-N-1=10$ (where N=20, for the 20th cycle) states are skipped to find the new initial seed 166, 168, value 10010, at state 16. This is fed to the MISR at cycle 0 170, and new all 1's expected signature 172 derived at the 20th cycle.

Figure 16:
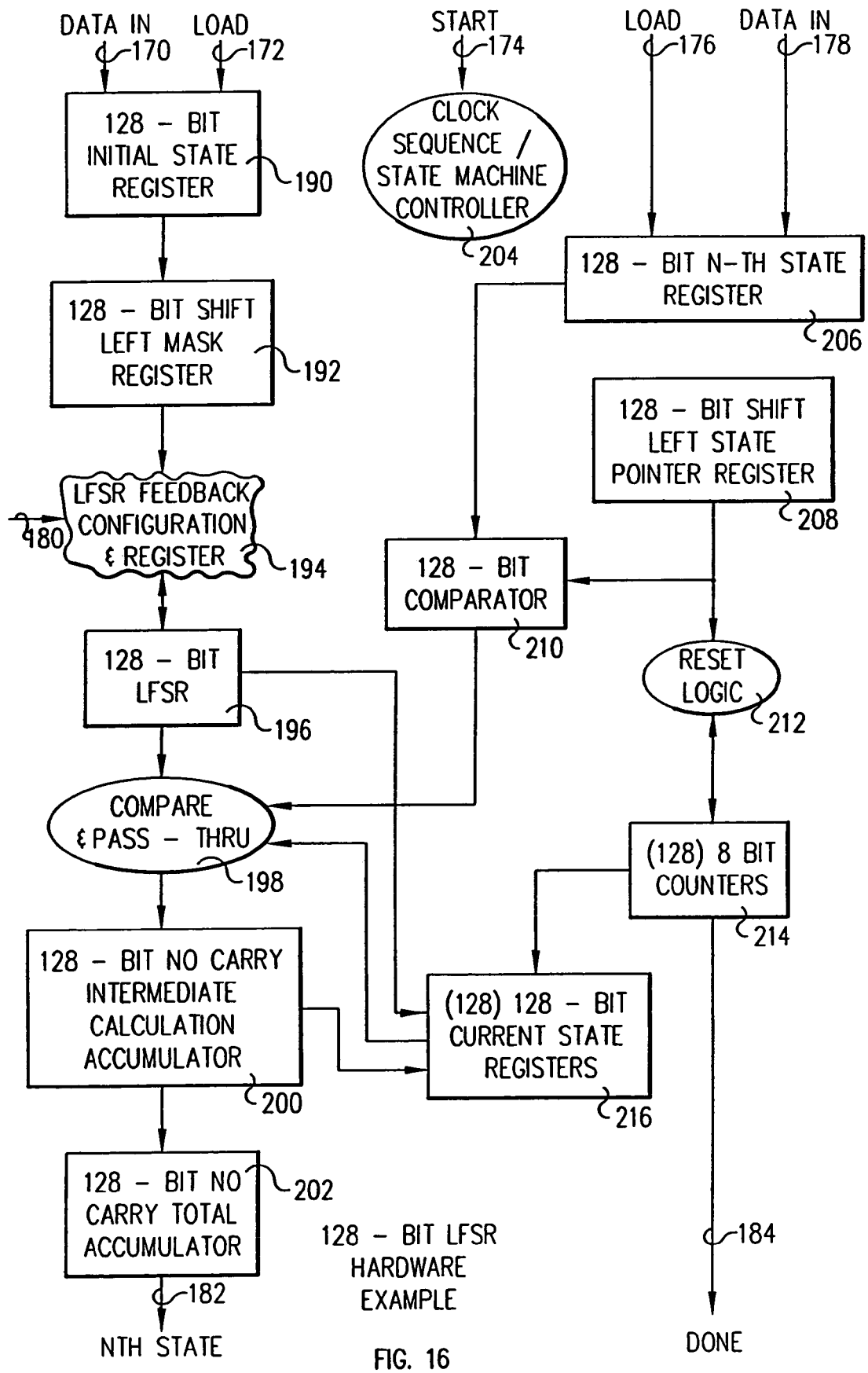
FIG. 16 is schematic representation of an hardware embodiment of the Nth state concept using a 128-bit LFSR.

FIG. 16 illustrates an exemplary hardware embodiment of the Nth state algorithm for a 128-bit LFSR. The external interface includes loading LFSR initial state 190, loading LFSR configuration register 194 with configuration value 180, loading desired n-th state into register 206, receiving start 194 into clock sequence and state machine controller 204 for clocking components 190, 192, 196, 200, 216, 210, 214, 208 and 206, and upon receiving done signal 184 reading the n-th state value 182 from accumulator 202.

Internal handshaking includes shift register 192 masking bit=x of initial state 190; loading the masked value into LFSR 196; applying a single clock 204 (so that LFSR 196 has a value of state=1, bit=x); loading LFSR 196 into the lowest level current state register 216; state pointer 208 masking each bit of desired n-th state 206, and for each bit that is set, reset logic 212 and counters 214 generating the value of bit=x for the given masked state using register 216, logic 198 and accumulator 200; once all necessary states are stored in register 216, summing the states in accumulator 202; and repeating steps 190, 194, 206, 204, and 202 for each bit in initial state register 190.

Figure 1:
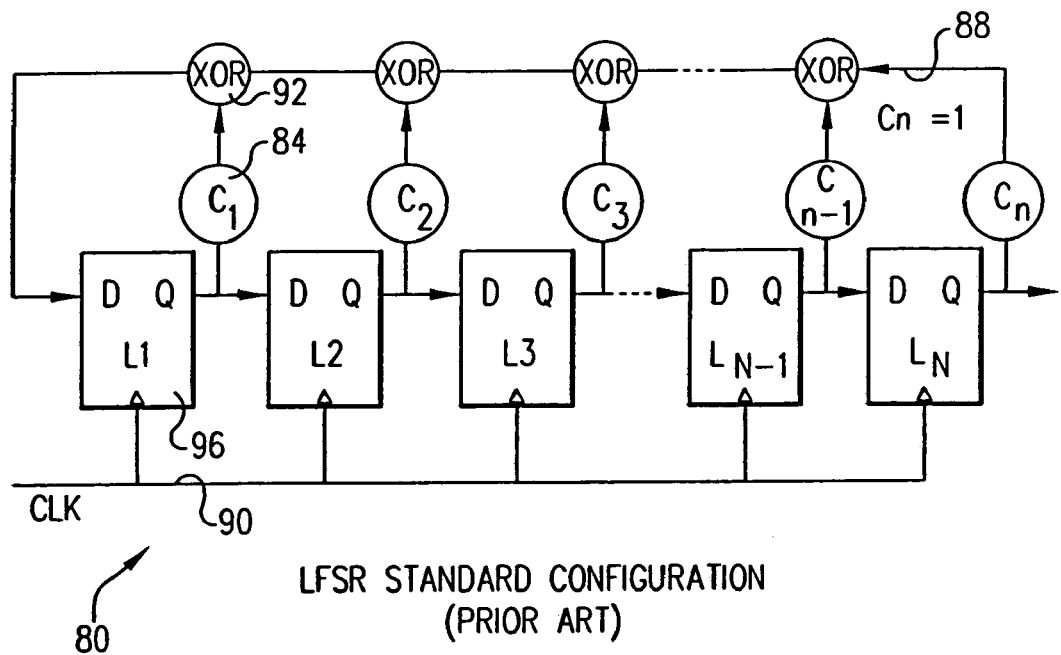
FIG. 1 is a schematic representation of a standard generic linear feedback shift registers (LFSR).
Figure 2:
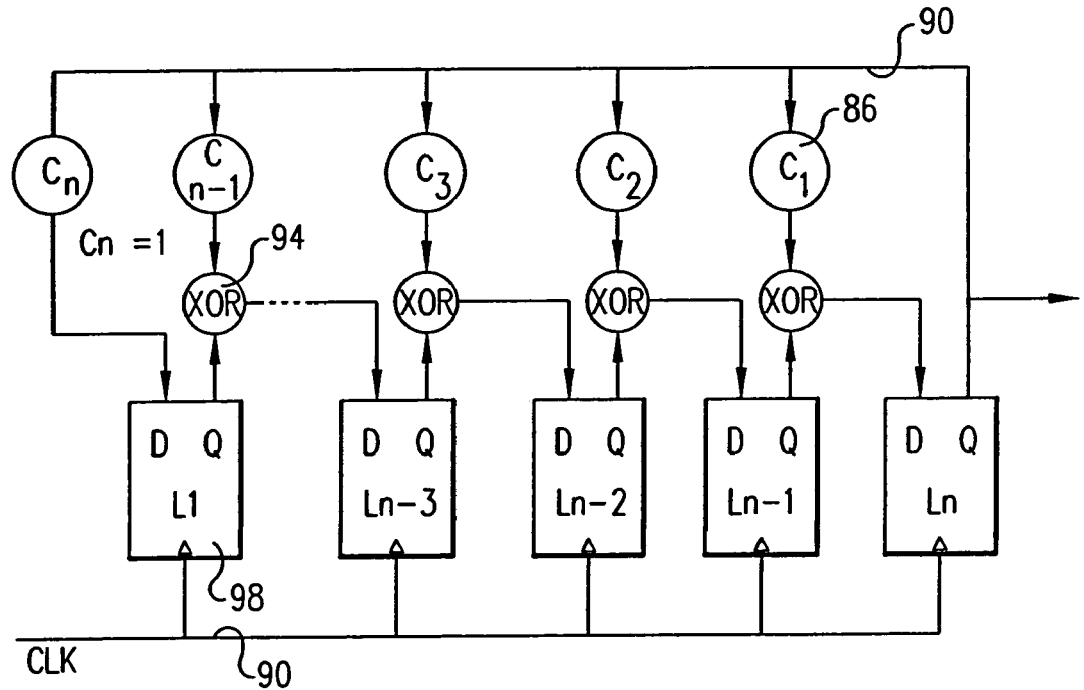
FIG. 2 is a schematic representation of a modular generic LFSR.
Figures 3, 4:
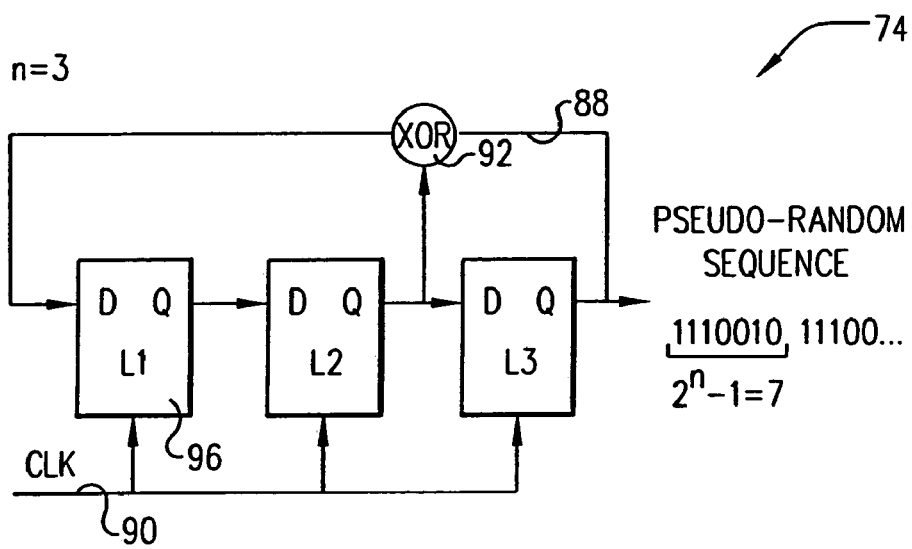
FIG. 3 illustrates the truth table for a modulo-2 adder.
FIG. 4 is a schematic representation of a three stage (n=3) maximal length configured LFSR.
Figure 5:
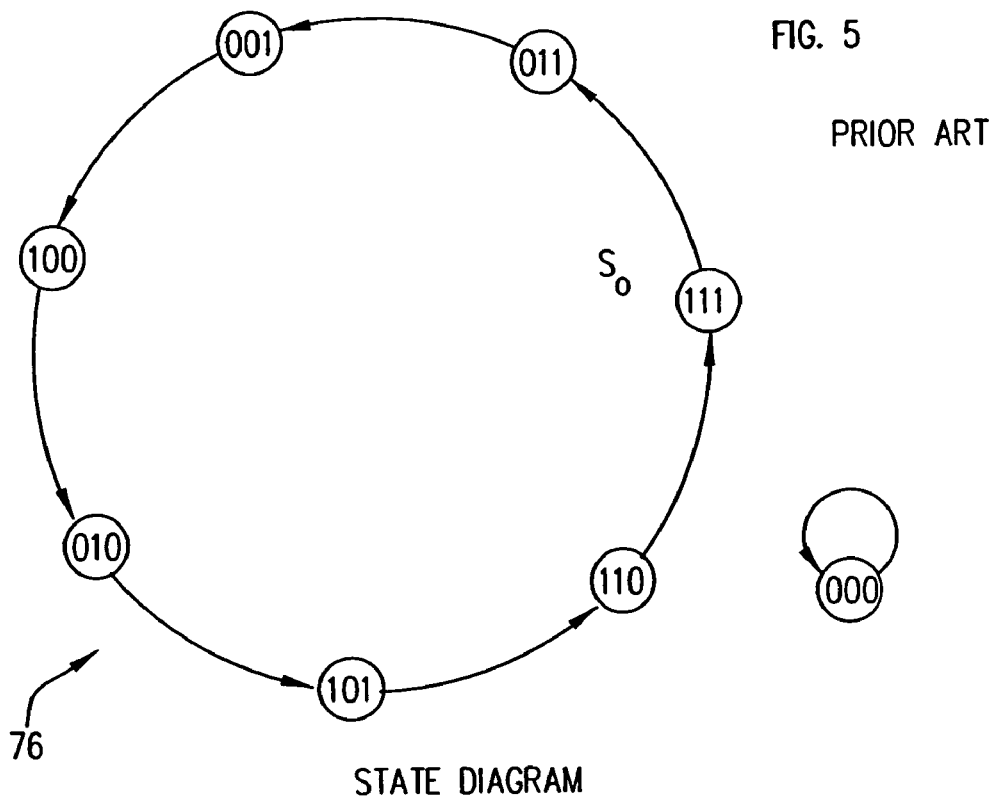
FIG. 5 is a state diagram illustrating the sequence of states that the LFSR of FIG. 4 cycles through after being initialized to all "1"s at state $S_0$.
Figure 17:
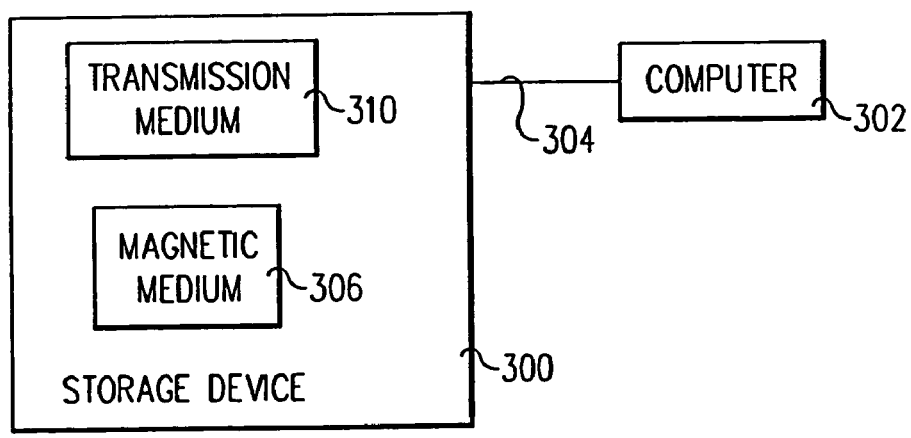
FIG. 17 is a high level system diagram illustrating a program storage device readable by a machine, tangibly embodying a program of instructions executable by a machine to perform method steps for dynamically assigning I/O priority.
Figure 6:
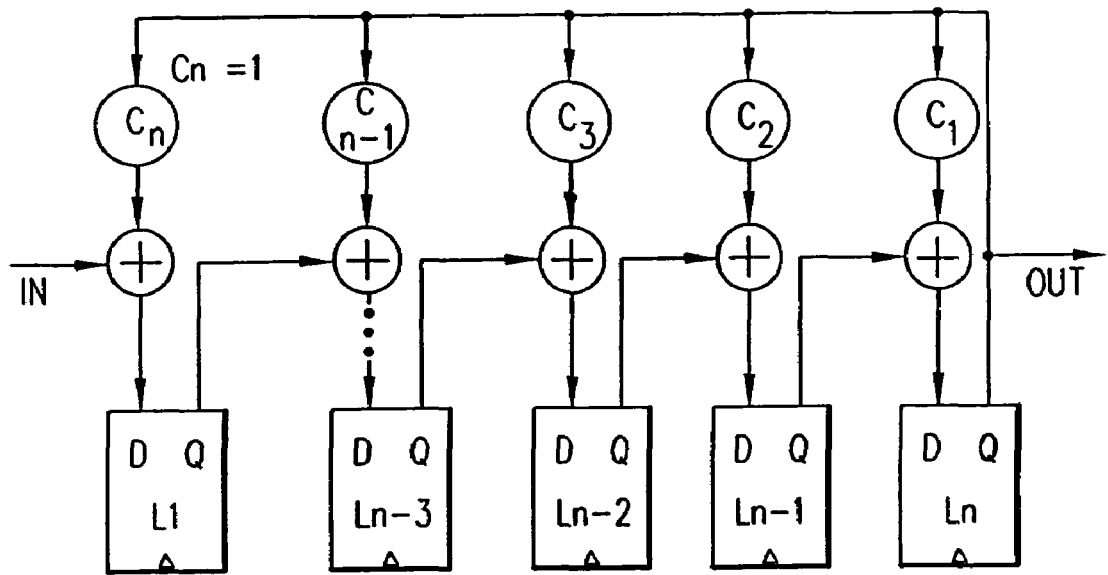
FIG. 6 is a schematic representation of a single input signature register (SISR).
Figure 7:
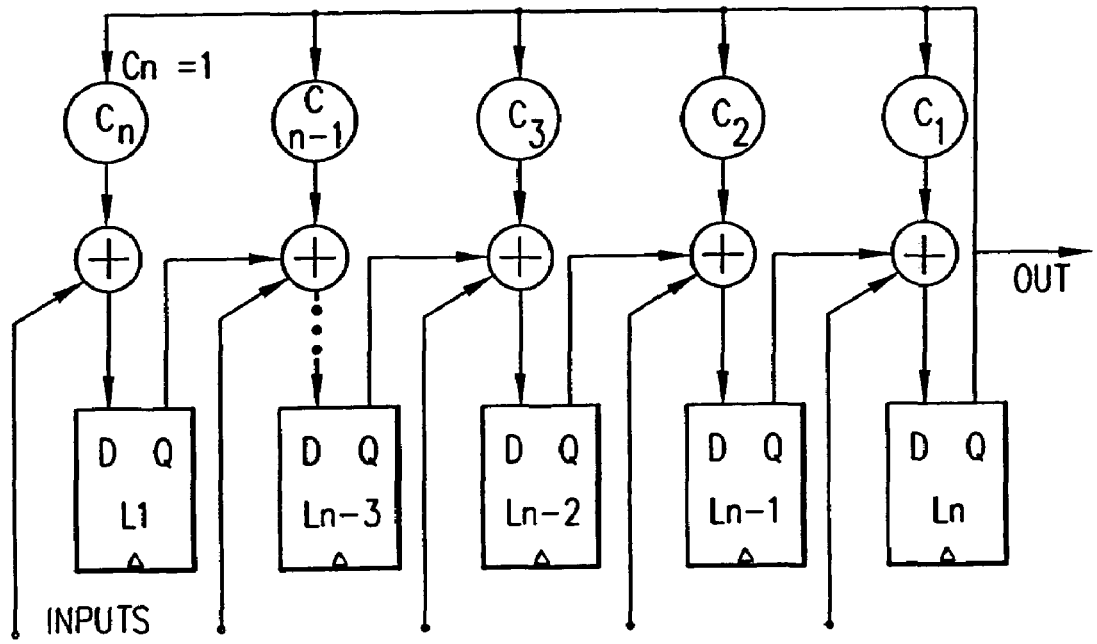
FIG. 7 is a schematic representation of a multiple input signature register (MISR).

It will be appreciated that, although specific embodiments of the invention have been described herein for purposes of illustration, various modifications may be made without departing from the spirit and scope of the invention. Referring to FIG. 17, in particular, it is within the scope of the invention to provide a computer program product or program element. The computer program product may be stored in a program storage or memory device 300 such as a solid or fluid transmission medium 310, magnetic or optical wire, tape or optical disc 306, or the like, capable of storing signals readable by a machine as is illustrated by line 304, for controlling the operation of a computer 302 according to the method of the invention and/or to structure its components in accordance with the system of the invention.

Further, each step of the method may be executed on any general purpose computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for determining the Nth state of an n-stage linear feedback shift register (LFSR) providing a result useful in applications including password generation, convergent signature analysis, and encryption, comprising steps of:

building a look-up table of n-bit states for latch positions of said linear feedback shift register;

obtaining a modulo remainder of said Nth state; and generating directly from said modulo remainder and said n-bit states said Nth state and, if in standard form, further comprising steps of:

converting said LFSR to modular form;

modulo ($2^n-1$) dividing a desired cycle count N to derive a remainder value N";

building said look-up table to include x, y, and z values, where x=LFSR latch position (0, 1, . . . , n−1);

y=$2^i$ for i=0, n−1 (for i=0, 1, 2, 3, . . . , n−1), giving values (0, 1, 2, 4, 8, . . . , $2^{n-1}$); and z=n-bit state of said LFSR for (x, y);

first determining all cycle rows Ci needed to binary add to said remainder value N";

for each said bit position y in a first said cycle row Ci, second determining said n-bit state z;

for each bit set in each said n-bit state z, third determining for a next cycle row Ci said n-bit state z; and exclusive ORing all said n-bit states to determine said Nth state.

2. The method of claim 1, said third determining step comprising:

identifying for each bit set in said remainder value N" a corresponding cycle row y;

for a first identified cycle row in N", determining from said look-up table a corresponding n-bit state $S_{first\ cycle\ row}$; and for each bit set in said n-bit state $S_{first\_cycle\_row}$, next determining from said look-up table a next corresponding n-bit state $S_{first\_cycle\_row}$;

repeating said next determining step until all final states $S_{final\_cycle\_row}$ are reached for said bit set in said n-bit state $S_{first\_cycle\_row}$;

exclusive ORing all said final states for said bit set in said n-bit state; and repeating said determining steps until processing all bits set in said LFSR.

3. The method of claim 1, further comprising responsive to said Nth state, selectively executing at least one of password generation, convergent signature analysis, secure credit card processing, system security integration, and encryption encoding and decoding.

4. A computer program product comprising a computer storage medium storing a computer readable program, wherein the computer readable program when executed on a computer causes the computer to perform method steps for determining the Nth state of an n-stage linear feedback shift register (LFSR), providing a result useful in applications including password generation, convergent signature analysis, and encryption, said method comprising:

building a look-up table of n-bit states for latch positions of said linear feedback shift register;

obtaining a modulo remainder of said Nth state; and generating directly from said modulo remainder and said n-bit states said Nth state and, if in standard form, further comprising steps of:

converting said LFSR to modular form;

modulo ($2^n-1$) dividing a desired cycle count N to derive a remainder value N";

building said look-up table to include x, y, and z values, where x=LFSR latch position (0, 1, . . . , n−1); y=$2^i$ for i=0, n−1 (for i=0, 1, 2, 3, . . . , n−1), giving values (0, 1, 2, 4, 8, . . . , $2^{n-1}$); and z=n-bit state of said LFSR for (x, y);

identifying for each bit set in said remainder value N" a corresponding cycle row y;

for a first identified cycle row in N", determining from said look-up table a corresponding n-bit state $S_{first\_cycle\_row}$;

for each bit set in said n-bit state $S_{first\_cycle\_row}$, next determining from said look-up table a next corresponding n-bit state $S_{first\_cycle\_row}$;

repeating said next determining step until all final states $S_{first\_cycle\_row}$ are reached for said bit set in said n-bit state $S_{first\_cycle\_row}$;

exclusive ORing all said final states for said bit set in said n-bit state;

repeating said determining steps until processing all bits set in said LFSR; and exclusive ORing all said final states for all said bits set in said LFSR to determine said Nth state of said LFSR.

5. The computer program product of claim 4, said method further comprising responsive to said Nth state, selectively executing at least one of password generation, convergent signature analysis, secure credit card processing, system security integration, and encryption encoding and decoding.

6. The computer program product of claim 4, said method further comprising selectively compressing data and generating signatures responsive to said Nth state.

7. A system for determining the Nth state of an n-stage linear feedback shift register (LFSR), providing a result useful in applications including password generation, convergent signature analysis, and encryption, comprising:

means for building a look-up table of n-bit states for latch positions of said linear feedback shift register;

means for obtaining a modulo remainder of said Nth state;

means for generating said Nth state directly from said modulo remainder and said n-bit states:

means for converting said LFSR to modular form if in standard form;

means for modulo ($2^n-1$) dividing a desired cycle count N to derive a remainder value N";

means for building said look-up table to include x, y, and z values, where x=LFSR latch position (0, 1, . . . , n−1);

y=$2^i$ for i=0, n−1 (for i=0, 1, 2, 3, . . . , n−1), giving values (0, 1, 2, 4, 8, . . . , $2^{n-1}$); and z=n-bit state of said LFSR for (x, y);

first means for determining all cycle rows Ci needed to binary add to said remainder value N";

second means for determining said n-bit state z for each said bit position y in a first said cycle row Ci;

third means for determining for a next cycle row Ci said n-bit state z for each bit set in each said n-bit state z; and means for exclusive ORing all said n-bit states to determine said Nth state.

8. The system of claim 7, said third means further comprising:

means for identifying for each bit set in said remainder value N" a corresponding cycle row y;

means for determining from said look-up table a corresponding n-bit state $S_{first\_cycle\_row}$ for a first identified cycle row in N";

means for processing each bit set in said n-bit state $S_{first\_cycle\_row}$, to determine from said look-up table a next corresponding n-bit state $S_{next\_cycle\_row}$;

fourth means for executing said means for processing until all final states $S_{final\_cycle\_row}$ are reached for said bit set in said n-bit state $S_{first\_cycle\_row}$; and then for exclusive ORing all said final states for said bit set in said n-bit state; and fifth means for repeating execution of said fourth means for all bits set in said LFSR.

9. The system of claim 8, further comprising means responsive to said Nth state for selectively executing at least one of password generation, convergent signature analysis, secure credit card processing, system security integration, and encryption encoding and decoding.

* * * * *